United States Patent [19]

Nunes, Jr.

[11] 3,807,504

[45] Apr. 30, 1974

[54] SOD HARVESTING APPARATUS

[76] Inventor: John F. Nunes, Jr., 2006 Loquat Ave., Patterson, Calif. 95363

[22] Filed: May 18, 1972

[21] Appl. No.: 254,614

[52] U.S. Cl. ................................ 172/20, 172/19
[51] Int. Cl. ............................................ A01b 45/04
[58] Field of Search ................................ 172/19, 20

[56] References Cited
UNITED STATES PATENTS

| | | | |
|---|---|---|---|
| 2,345,425 | 3/1944 | Phillips | 172/20 |
| 2,614,477 | 10/1952 | Habenicht | 172/20 |
| 2,617,347 | 11/1952 | Provost | 172/20 |
| 2,998,081 | 8/1961 | Hartmangruber et al. | 172/20 |
| 3,519,082 | 7/1970 | Miner | 172/20 X |
| 3,590,927 | 7/1971 | Brouwer et al. | 172/19 |
| 3,658,134 | 4/1972 | Bibby | 172/20 |
| 3,695,713 | 10/1972 | Rothi et al. | 172/19 X |

*Primary Examiner*—Robert E. Pulfrey
*Assistant Examiner*—Paul T. Sewell
*Attorney, Agent, or Firm*—Flehr, Hohbach, Test, Albritton & Herbert

[57] ABSTRACT

For harvesting sod, an inclined conveyor assembly is supported alongside a tractor or other apparatus with the lower end of the conveyor in position to receive sod freshly cut from the earth. The front end of the conveyor is supported by a large roller and the upper end of the conveyor framework is pivotally supported to the carrier or tractor or other moving framework whereby the lower end of the conveyor can rise and fall in terrain following movement. The sod roller is also mounted to rock from side to side in conjunction with a sub-frame which supports a reciprocating cutting knife disposed beneath and behind the sod roller so as to cut the sod from the ground. Freely rotatable coulter blades are carried in flanking positions at the ends of the cutter blade so as to sharply shear the end edges of the ribbon of sod being cut.

3 Claims, 10 Drawing Figures

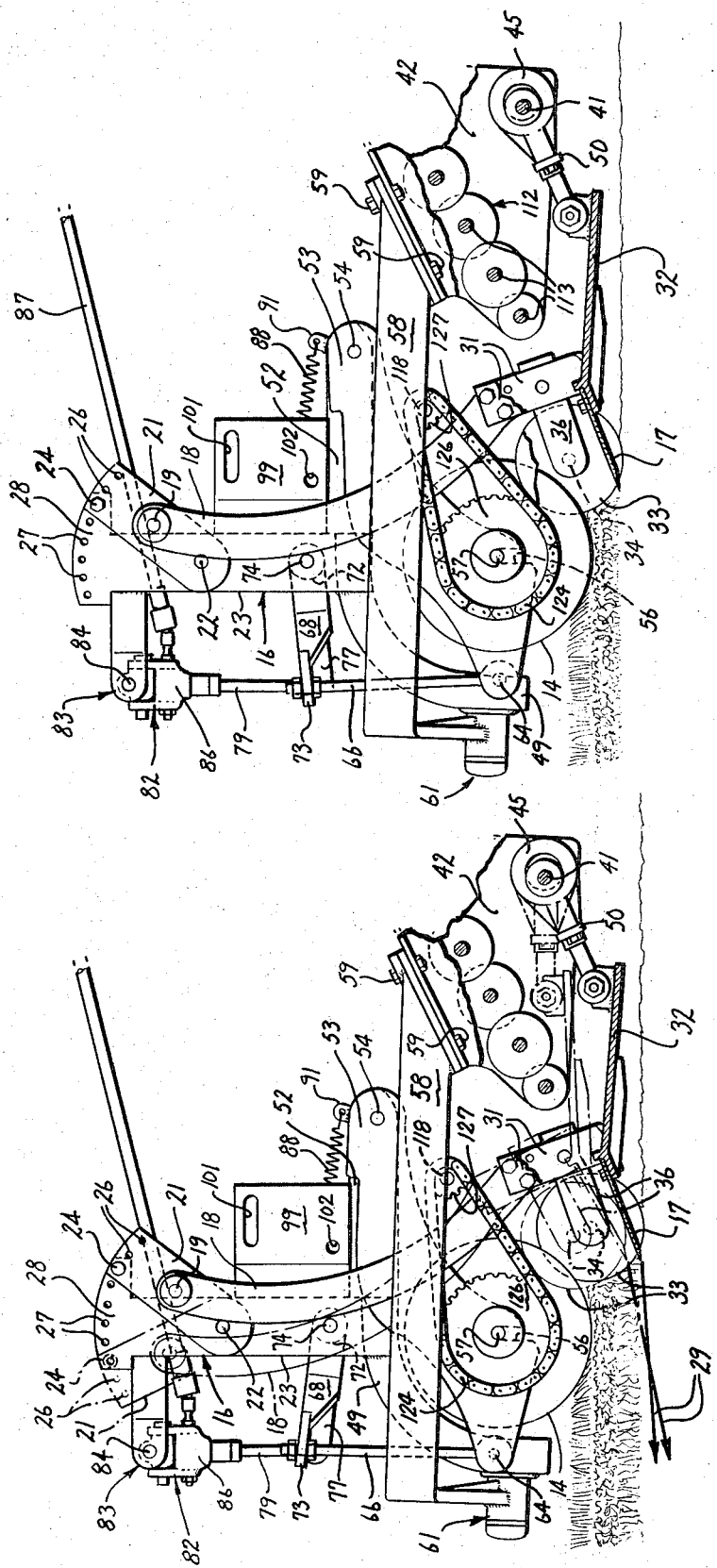

3,807,504

SOD HARVESTING APPARATUS

BACKGROUND OF THE INVENTION

This invention pertains to a sod harvesting apparatus and more particularly to that portion of sod harvesting apparatus pertaining to the mobilized cutting and conveying of sod for harvesting same, as by rolling, folding, etc.

Heretofore, the cutting of sod from the earth has typically experienced a number of problems, such as that of a short blade life requiring the frequent replacement of cutter blades, ragged edges being left at the sides of the ribbon of sod which is cut due to tearing of the edges of the ribbon, and other similar types of problems. Further, sod harvesting has typically been most satisfactory as a two stage operation, the first stage being that of cutting the sod with one machine and then following with a second machine which picks up the severed sod promptly in order to preclude regrowth of the roots and reattachment to the earth of the severed ribbons of sod.

Accordingly, it has been long desired to provide a satisfactory means for harvesting the sod in a single movement across a field with one machine involving the functions of cutting the sod, sub-dividing the sod into short lengths thereof, and rolling or folding the sod lengths which are picked up from the field by the machine.

While attainment of the foregoing type of equipment which performs all functions in a single pass across a field of sod has long been recognized as needed, one of the major problems has been that of incorporating successful sod cutting means for cutting a ribbon of sod loose from the earth as the initial step in the harvesting of the sod.

Accordingly, there has been a substantial need for an improved sod cutting machine as incorporated in a sod harvesting apparatus of the kind described.

SUMMARY OF THE INVENTION AND OBJECTS

In general, in conjunction with a sod harvesting apparatus for moving in a path across a field of sod to be harvested, there is disclosed herein a rigid inclined frame carrying a sod conveyor. Pivot means at the upper end of the inclined frame serve to support same to permit the lower end thereof to rise and fall in terrain following movement as the apparatus moves across a field of sod. An elongate sod roller of substantial mass in interposed to support the lower end of the frame spaced from the sod field while a sub-frame assembly is supported by the sod roller pivotally coupled to the frame to permit the roller to rock about an axis extending in the direction of movement along the path. An elongate cutter blade extends across the path behind and beneath the roller and is carried by means supporting the cutter blade from the sub-frame so as to rock with the rocking of the roller and to reciprocate into and out of the root portion of the sod to cut a ribbon of sod from the field while maintaining a uniform constant spacing between the blade and roller during cutting.

According to one feature of the invention, a reciprocating drive means is disposed beneath the ribbon of sod together with a drive connection interconnecting the cutter blade and the drive means. The drive connection is disposed closely adjacent the bare earth beneath the sod ribbon so as to provide direct thrust between the drive means and blade from a position directly behind the blade. Further, freely rotatably coulter discs flank the end edges of the blade and cooperate therewith in closely spaced relation for vertically shearing the side edges of the ribbon of sod to provide a neatly trimmed sod ribbon. Other preferred features of the invention are disclosed more particularly herebelow.

It is a general object of the present invention to provide an improved harvesting machine and method.

It is another object of the invention to provide an improved sod harvesting machine characterized by improved cutting means and method for releasing the sod from the earth in a manner suitable to incorporation in an overall sod harvesting machine employing conveyor means and the like.

The foregoing and other objects of the invention will become more readily evident from the following detailed description of preferred embodiments.

BRIEF DESCRIPTION OF THE DRAWING

FIG. 6 shows a side elevation view with portions broken away and in section for illustrating the adjustments to the angle of attack applied by the cutting blade and also for showing the maximum thickness of sod to be cut by the cutting blade;

FIG. 7 is a view similar to FIG. 6 in which a thinner thickness of sod is being cut by virtue of adjustments to the machine;

DETAILED DESCRIPTION OF PREFERRED EMBODIMENTS

Figure 1:
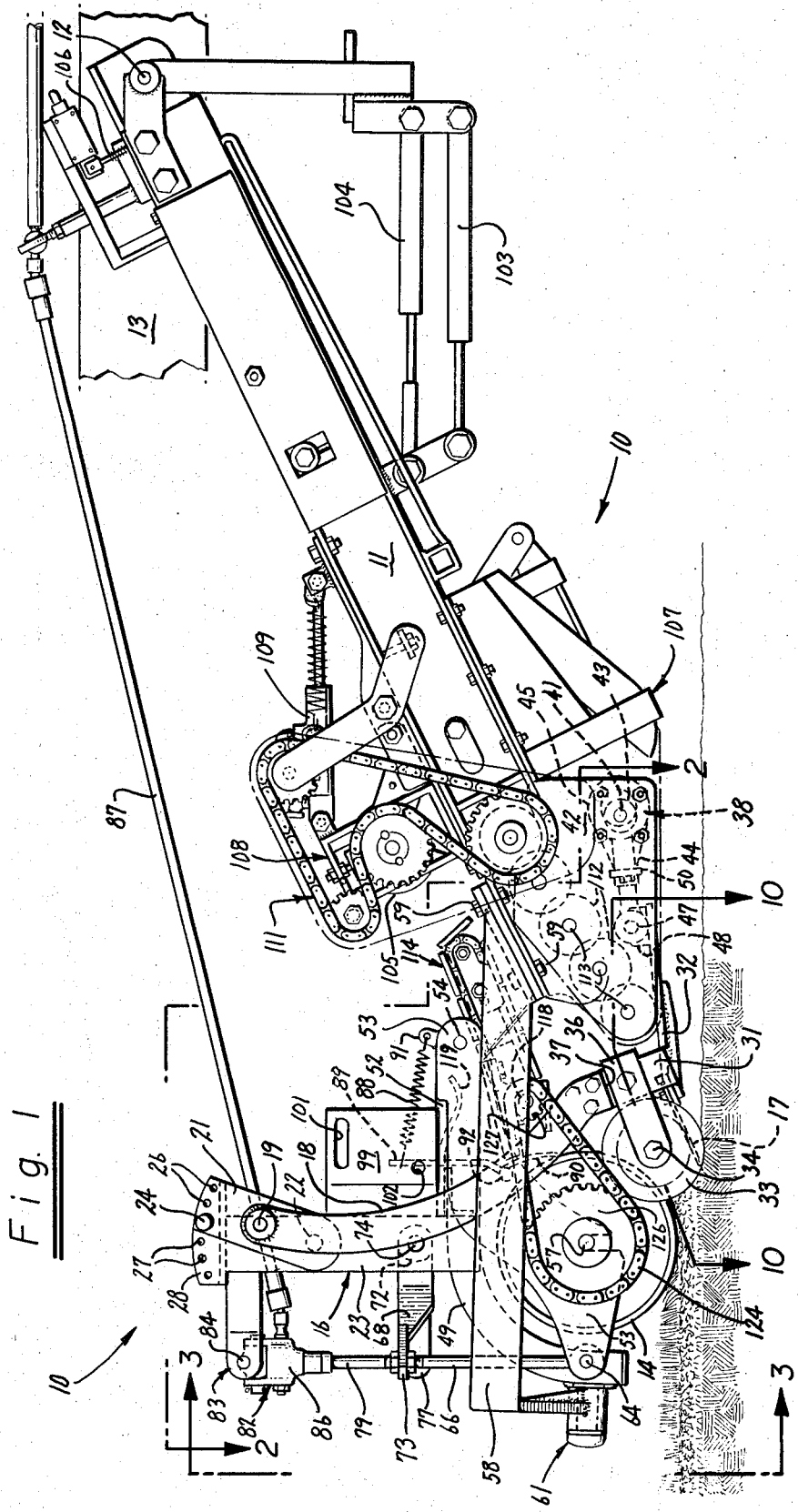
FIG. 1 shows a side elevation view of a sod harvesting machine according to the invention.
Figure 2:
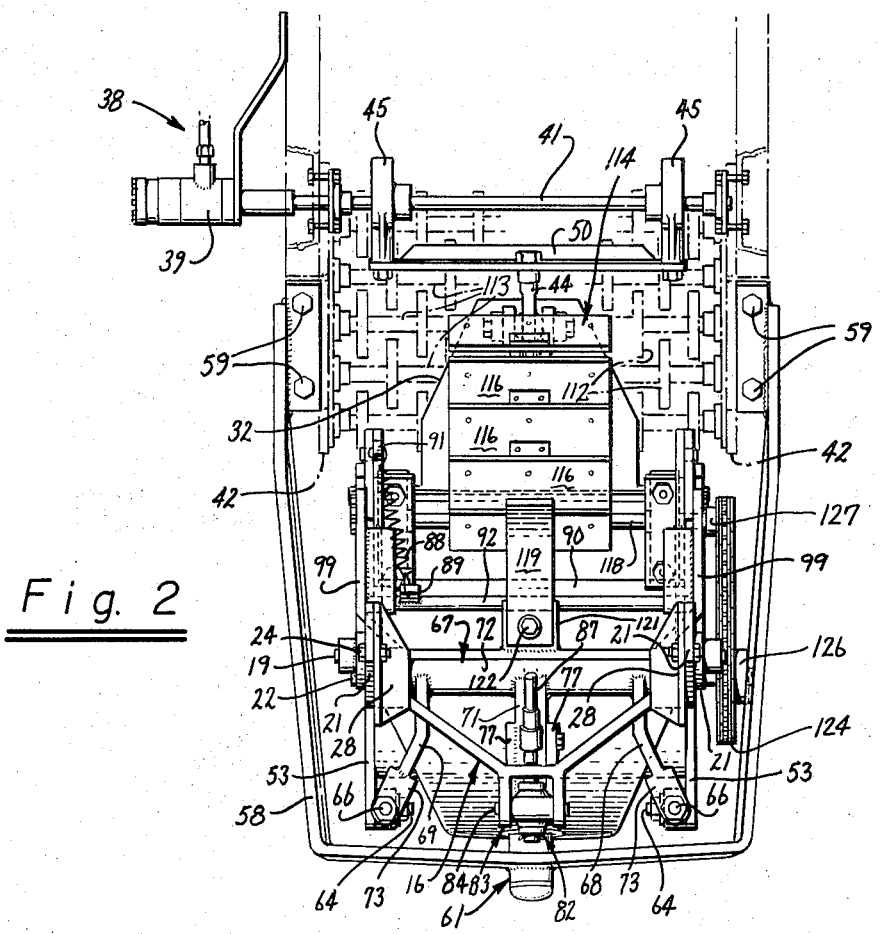
FIG. 2 shows a top plan view of a leading portion of the sod harvesting machine shown in FIG. 1.
Figure 3:
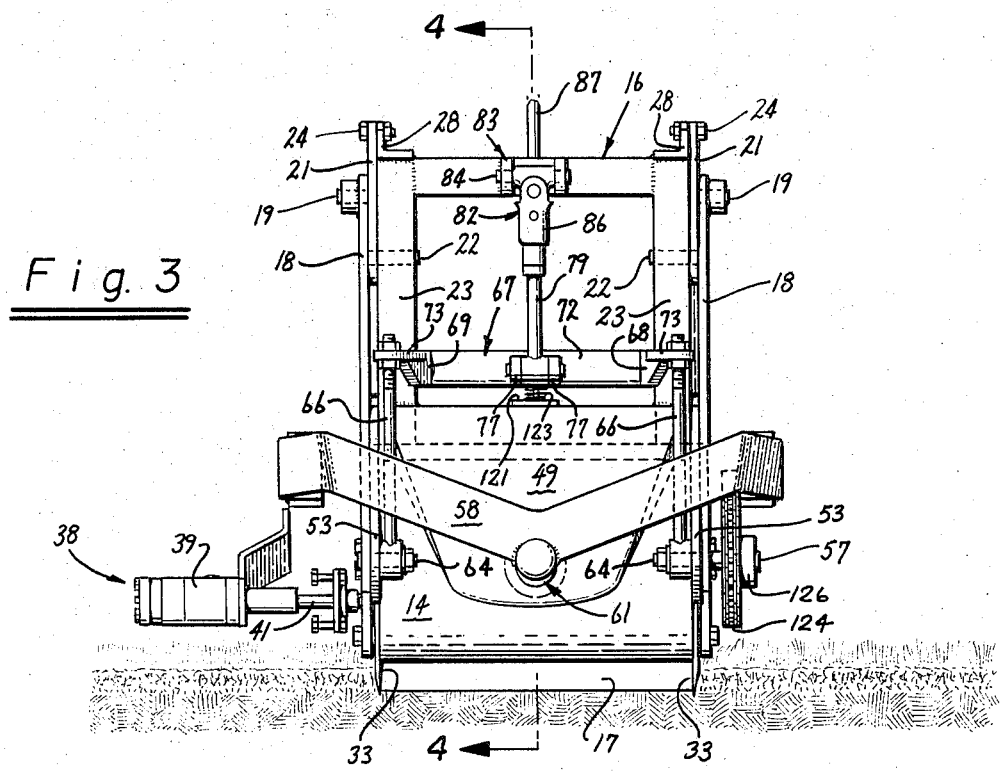
FIG. 3 shows a front elevation view of the sod harvesting machine shown in FIG. 2.

Sod harvesting apparatus 10 is characterized by a rigid inclined frame 11 carrying conveyor means (not shown) therein of a type such as shown in U.S. Pat. No. 3,580,375.

A pivot pin 12 supports the upper end of frame 11 so as to permit its lower end to rise and fall as desired. Pivot pin 12 is carried by a portion of the travelling frame or carrier 13 such as a portion of a tractor or other vehicular carriage or the like.

An elongate sod roller 14 of substantial mass or weight and relatively large diameter is, in general, interposed to support the lower end of frame 11 in a manner spaced from the foliage side of the sod in the field.

Figure 5:
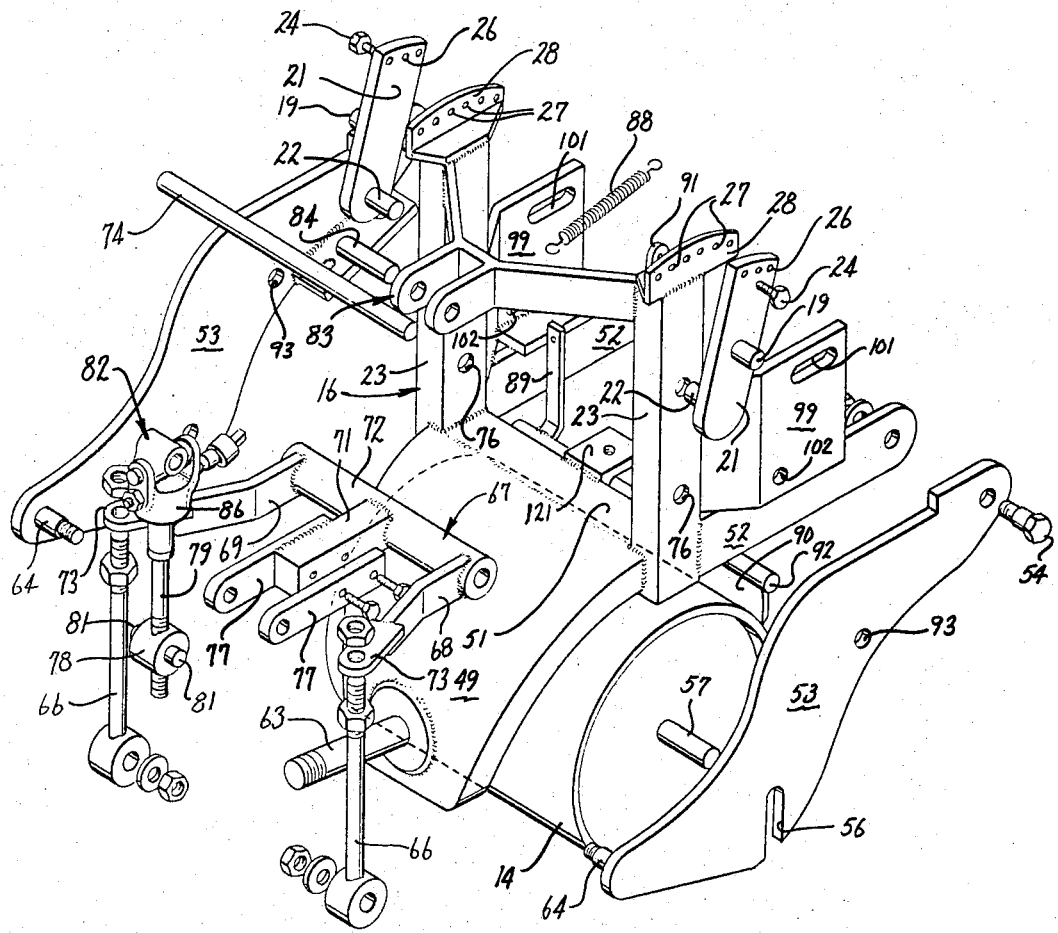
FIG. 5 shows an enlarged, exploded view of a portion of the sod harvesting machine shown in FIG. 1.

Accordingly, a sub-frame 16 (shown best in FIG. 5) is supported by roller 14 and pivotally coupled to frame 11 to permit roller 14 and sub-frame 16 to rock about an axis extending in the direction of the path of movement of the equipment relative to frame 11. An elongate cutter blade 17 extends across the path of movement immediately behind and beneath roller 14 whereby the blade can advance into the root portion of the sod just after the roller has passed over the sod but soon enough that the depth of the sod being cut remains constant.

Further, means supporting the cutter blade from the sub-frame 16 permit blade 17 to reciprocate into and out of the root portion of the sod to cut a ribbon of sod from the field. This means includes primarily the two elongate curved support arms 18 pivotally secured at their upper ends by means of pivot pins 19 extending through a boss portion of arm 18 and into a blade angle adjustment plate 21.

Plates 21 are pivotally mounted to rotate about their respective stub supports 22 extending into openings formed in the sides of the upwardly extending box-shaped sub-frame arms 23 whereby the upper ends of plates 21 can be moved through an arc. Plates 21 are secured, as by means of the bolts 24 extending through openings 26 formed in the upper ends of plates 21 and registered with one of the openings 27 formed in the upper end of the flange portion 28 carried atop each of sub-frame arms 23.

As thus arranged, and as shown particularly in FIG. 6, the angle of attack of the cutter blade 17 can be tipped to cut in the direction of one or the other of the two arrows 29 so as to provide a range of angles with which the blade can be used.

An arm extension portion 31 bolted to the lower end of blade support arms 18 is formed as an upwardly extending ear or tab at each of the opposite ends of the transversely extending elongate blade carrier 32 having a generally broad, flat, elongate surface extending across the path of movement of the machine.

The rear edge of blade 17 is suitably bolted to blade carrier 32. Further, as shown in the embodiment disclosed in FIG. 1, coulter discs 33 are mounted for free rotation on axles 34 disposed in the ends of elongate coulter support arms 36 bolted at right angles to the lower end of blade support arms 18. A shoulder 37 formed between portion 31 and arm 18 serves to prevent coulter support arms 36 from being driven upwardly.

Figure 4:
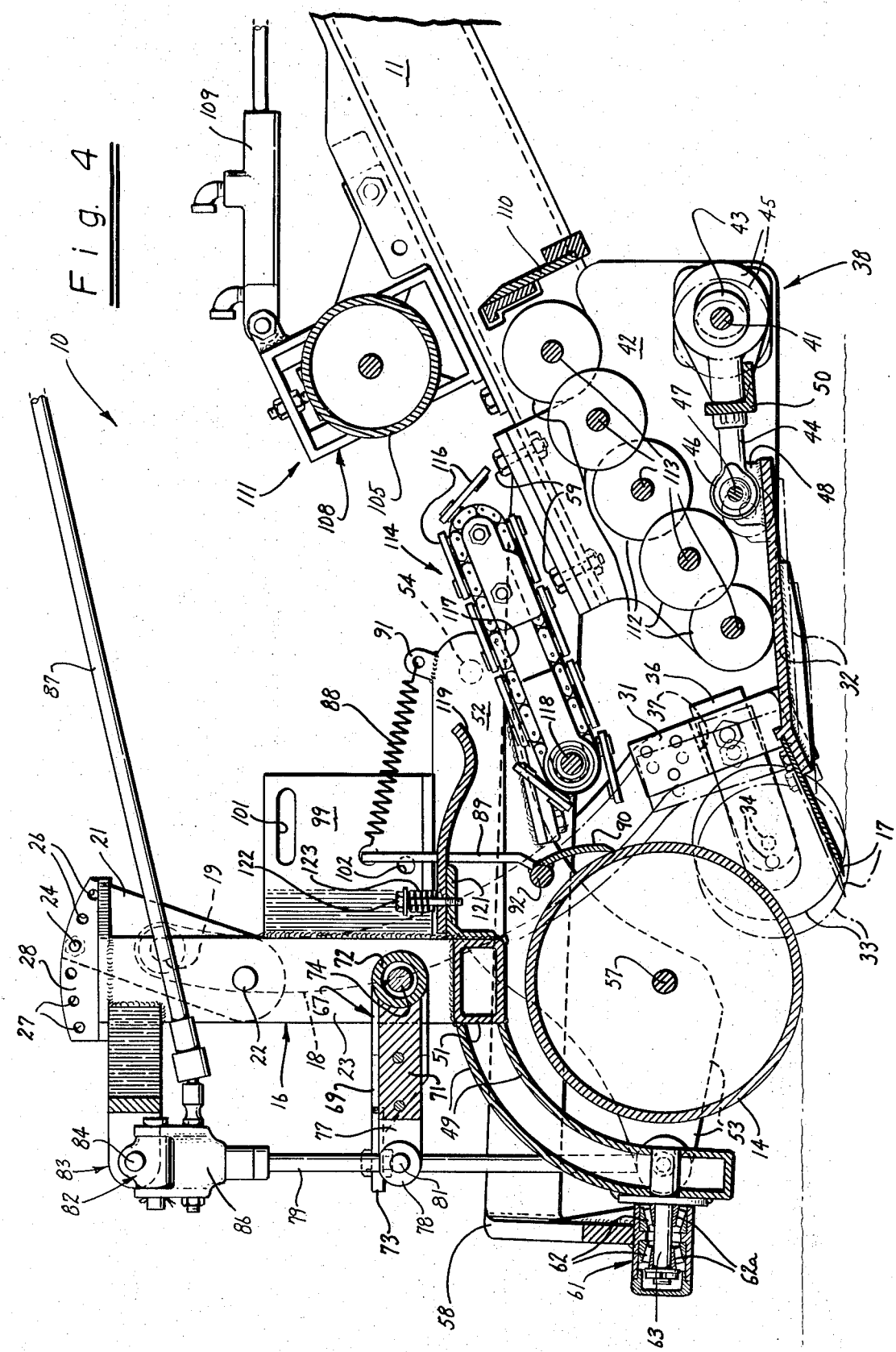
FIG. 4 shows a side elevation view in enlarged detail taken along the line 4—4 of FIG. 3.

Means forming a reciprocating drive or power source 38 coupled to drive blade 17 to advance and retreat into and out of engagement with the root portion of sod being severed from the ground comprises the hydraulic motor 39 rotating a drive shaft 41 carried by a side plate 42 hung from beneath conveyor frame 11 and serving further to support eccentrics 43 for rotation on shaft 41 so as to rapidly reciprocate a drive connection in the form of the connecting rod 44. The left end, as shown in FIG. 4, of connecting rod 44 carries a universal ball end fixture 46 formed with an opening transversely therethrough and including the connecting link 47 for engaging the clevis 48.

As thus arranged, a universal movement is provided in the region of connecting link 47 so as to provide flexibility between the trailing portion of blade carrier 32 and connecting rod 44.

As described thus far, the opposite ends of blade 17 are supported by the elongate support arms 18 carried from the upper ends of sub-frame 16 which is free to rock about an axis extending in the direction of movement of the apparatus as the sod harvesting apparatus 10 progresses across a field. In this way, the rocking movement of sod roller 14 is matched by a similar rocking movement of blade 17 and both rise and fall together about pivot pin 12.

Sub-frame 16 includes an arcuate double walled hood portion 49 curving in spaced relation above and ahead of roller 14 and welded to a transversely extending box-shaped stringer 51 forming the upper end of sub-frame 16.

The upwardly extending box-shaped arms 23 are also welded to the ends of the stringer 51 for supporting the means for adjusting the blade angle as above described.

Sub-frame 16 further includes integral therewith the pair of rearwardly extending arms 52 which serve to pivotally support the upper right hand ends (as shown) of a pair of roller carriage plates 53 coupled to the ends of arms 52 as by means of a bolt or similar pivot connection 54.

The right hand carriage plate 53 (as shown) includes an elongate slot 56 formed upwardly from the lower edge thereof for receiving one of the two stub shafts 57 extending from the ends of roller 14. The other carriage plate 53 includes a simple opening for accommodating entry of stub shaft 57 at that location inasmuch as only one of the two side plates 56 requires a slot for assembling the roller. In general, sod roller 14 serves to support most of the weight of the leading end of frame 11 as well as the weight of sub-frame 16 and its associated assembly in a manner whereby roller 14 can readily tip from side to side and rise and fall in terrain following movements. Thus, a frame extension yoke 58 attaches by bolts 59 at the top of the lower end of frame 11. Yoke 58 includes a journal bearing housing 61 containing a roller bearing 62 which includes an inner race 62a for supporting the sub-frame support axle 63.

As thus arranged, the weight of the leading end of frame 11 and frame extension yoke 58 bears down heavily on axle 63 to carry sub-frame 16 downwardly. This downward movement is, however, resisted and supported by roller 14 acting through its axles 57 and carriage plates 53, each of which are formed with support pins 64 whereby the upwardly extending support rods 66 may be journalled thereon at their lower annular ends.

An E-shaped sod thickness control bracket 67 includes three lever arms 68, 69, 71 extending in a common plane from a tubular mounting piece 72. The outer ends of lever arms 68, 69 are formed with plates 73 having a hole therethrough for receiving the upper ends of rods 66.

Tubular mounting piece 72 is carried between the upwardly extending box-shaped arms 23 of sub-frame 16 by means of the mounting pin 74 which extends through openings 76 and the central portion of tubular mounting piece 72. In this way, control bracket 67 may rotate about pin 74 for purposes as will be described further below.

Lever arm 71 carries a pair of side extension members 77 spaced to receive therebetween the T-head portion 78 formed with trunnion stubs 81 extending therefrom to engage the holes in the ends of members 77. Control rod 79 includes threads on its lower end which threadedly engage a vertical opening formed through the T-head portion 78 whereby rotation of control rod 79 on its axis causes T-head 78 to move between advanced and retracted positions along the length of control rod 79. Accordingly, a knuckle assembly 82 is carried between the side portions of the U-shaped bracket 83 by means of a mounting pin 84. A pair of beveled drive gears (not shown) are of conventional style and contained within the knuckle portion 86 for transmitting rotational motion applied to reach rod 87 to produce a comparable rotational motion applied to control rod 79 whereby the threads on control rod 79 can be screwed and unscrewed relative to T-head 78.

As thus arranged, it is readily evident that reach rod 87 is utilized to raise and lower lever arm 71 about the axis of pin 74 whereby lever arms 68, 69 are similarly raised and lowered to raise and lower sub-frame 16 relative to roller 14 and in this way to raise and lower the depth at which blade 17 is disposed as shown by a comparison of FIGS. 6 and 7.

From the foregoing, it is readily evident that in FIG. 6 lever arm 71 has been drawn upwardly in the foregoing manner so as to permit roller 14 to closely approach the inner surface of hood portion 49 and thereby permit blade 17 to become further displaced below roller 14 to provide a relatively deep or thick cut to the sod. By contrast, as shown in FIG. 7, thickness control bracket 67 has been driven downwardly away from sub-frame 16 by action of reach rod 87 as may be controlled from an operator station (not shown) such as the driver of a tractor mounting apparatus of the kind described, so as to tend to urge roller 14 downwardly by attempting to drive support studs 64 carried on the ends of carriage plate 53 downwardly. This results in view of the fact that roller 14 cannot penetrate the ground in a lifting of sub-frame 16 and blade 17 relative to frame extension yoke 58 and the lower end of conveyor frame 11.

As thus arranged, roller 14 serves to rock the entire sub-frame 16 and its associated assembly of parts about the axis of axle 63 relative to frame extension yoke 58. On the other hand, as roller 14 rises and falls with respect to the terrain, it serves to lift not only sub-frame 16 but conveyor frame 11 as well to pivot about the pivot axis of the pivot support 12. In this way, roller 14 establishes a continuous reference level from which blade 17 can be disposed since blade 17 also rocks with the rocking movement of sub-frame 16 and rises and falls with the roller's terrain following movements about pivot support 12.

Having established a constant reference point from which to dispose blade 17, means are provided to keep the surface of roller 14 clean and free of dirt or any other accumulated material in order to insure that its diameter does not increase and thereby cause blade 17 to cut a thinner thickness of sod than intended.

Thus, an elongate doctor blade 90 substantially coextensive with the length of roller 14 engages the surface of roller 14 in cleaning relation therewith. Means for yieldingly urging doctor blade 90 against the periphery of roller 14 includes a spring 88 coupled between the doctor blade extension arm 89 and a protruding stationary tab 91. Doctor blade 90 includes an elongate rod-like rib along its upper edge terminating in stub ends 92 for engaging the journal openings 93 formed through carriage plates 53.

As noted above, the coulter discs 33 are mounted to advance and retreat with cutting blade 17.

Figure 8:
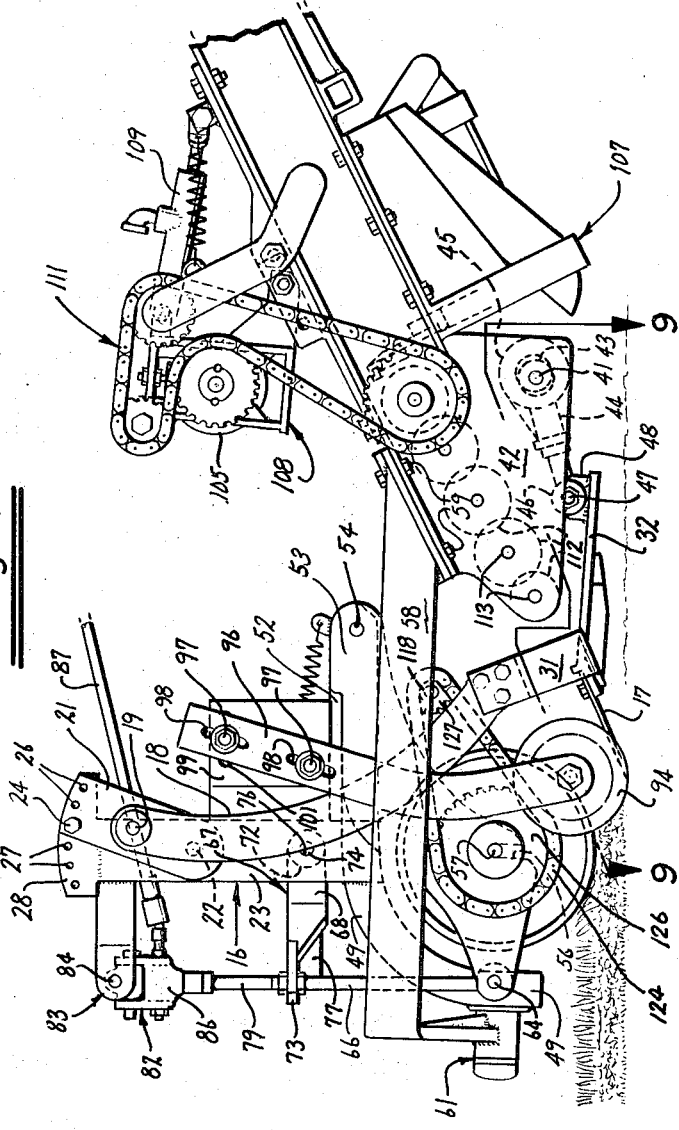
FIG. 8 shows a side elevation view of a sod harvesting machine according to the invention wherein adjustable coulter discs are employed which remain at a fixed position relative to the moving cutter blade.

However, according to another embodiment as shown in FIG. 8, coulter discs 94 are mounted for free rotation on the ends of elongate stationary support arms 96 adjustably attached by bolts 97 extending through adjustment slots 98 and into openings formed in the mounting brackets 99 welded to the backside of sub-frame 16.

It has been observed that sod-growing soil varies in various parts of the country whereby in certain parts of the country where the sod is somewhat sandy, it is advantageous to carry the coulters 33 in position to move between advanced and retracted positions carried on the ends of the cutter support arms 18. In other parts of the country where the soil is somewhat rocky and contains numerous stones, it has been found advantageous to use the stationary coulters 94 which can be positioned by making suitable adjustments of retaining bolts in the adjustment slots 98 and openings 101, 102.

Figure 9:
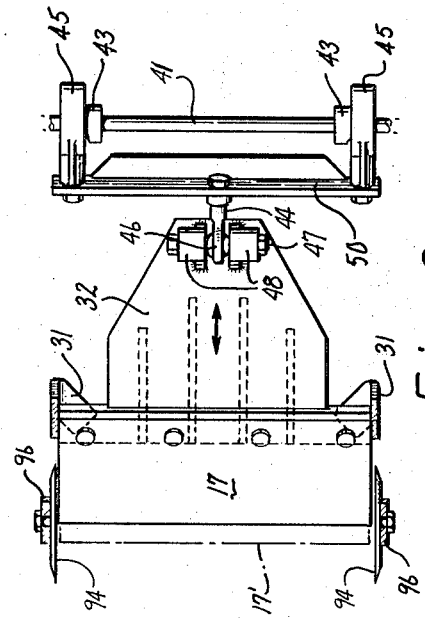
FIG. 9 shows a plan view of FIG. 8 taken along th line 9—9 thereof showing in phantom lines the displacement movement of cutting blade relative to the stationary coulters of the apparatus in FIG. 8.

As seen in plan view in FIG. 9, the embodiment shown in FIG. 8 serves to drive blade 17 between advanced and retracted positions while coulter blades 94 remain stationary as the blade moves to its forward phantom line position 17'.

Also, as shown best in FIG. 9, the rotation of drive shaft 41 serves to rotate the two eccentrics 43 in their eccentric bearing housings 45 which are in turn coupled to a cross bar 50 coupled to operate connecting rod 44.

Figure 10:
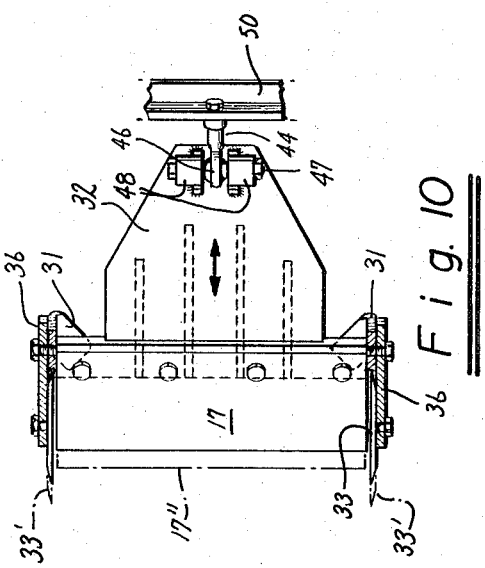
FIG. 10 is a view similar to that of FIG. 9 but taken along the line 10—10 of FIG. 1 wherein the coulters are movable with the cutting blade.

By comparison, as shown in FIG. 10 where the coulter blades are mounted on support arms 36, they will advance and retract to the phantom line positions 33' as shown in FIG. 10 as blade 17 moves to its phantom line position 17''.

Conveyor frame 11 may be raised or lowered by suitable controls coupled to the hydraulic rams 103, 104 and, while not shown herein, it is to be understood that as disclosed in U.S. Pat. No. 3,580,375, a cyclically driven conveyor belt is housed by frame 11 for carrying sod upwardly therealong and ultimately into engagement with a trigger element 106 for electrically operating a sod cutting device contained in the housing 107. Such a cutting device is fully disclosed in my copending application Ser. No. 70,728, field Sept. 9, 1970, wherein it is described that as the leading edge of a length of sod strikes the trigger 106, the cutter blade 110 contained in housing 107 will move between retracted and advanced positions into engagement with a cylindrical anvil element 105 so as to sever the sod.

As disclosed herein, however, the anvil element 105 is carried in a movable journal housing 108 whereby in the event of a jam in the region of the cutter, a hydraulic piston 109 can be activated to move the anvil assembly 111 to the position shown in FIG. 8 without introducing slack into the chain drive thereof.

Further, it is to be understood that the roller conveyor elements 112 (FIG. 4) are of resilient material mounted for rotation on axles 113 whereby as the undersurface of the sod moves upwardly along the top surface of discs 112, stones and other undesirable debris will fall downwardly to the ground. Ultimately, the sod enters the region of the cutting station 111 and passes upwardly along the conveyor (not shown) contained within frame 11 for harvesting.

In operation, roller 14 maintains a close following relation to the surface of the sod over which it passes whereby the sod will be rollingly depressed along a path across a field and just after the roller has passed a given portion of the sod, the blade can be reciprocated or driven directly from behind into engagement with the root portion of the sod to sever it from the earth. Thus, the blade is driven with a reciprocating movement to advance and retract into and out of the root portion of the sod just after the roller has passed but soon enough that the depth of the sod being cut remains constant due to the adjustments made in establishing the depth of the cut. (See FIGS. 6 and 7)

It has been observed that the location of the means for driving the blade into and out of engagement with the root portion of the sod tends to provide improved blade life and also serves to provide a cleaner cut to the underside of the sod. By employing the doctor blade 87, the depth of cut is maintained constant inasmuch as blade 17 rocks and dips with the rocking and dipping movement of the sub-frame 16 and roller 14.

Immediately above conveyor discs 112 (FIG. 4), a pivotally disposed sod advancing assembly 114 of a type disclosed in my U.S. Pat. No. 3,580,375 noted above provides top pressure and a forward advance to the sod moving upwardly onto the conveyor on frame 11.

Generally, assembly 114 includes a number of articulated pads 116 which travel, supported upon a cyclic chain 117, in a manner whereby they will move substantially parallel to the foliage surface of sod moving upwardly along the conveyor discs 112 so that the sod moves while engaged at both its top and bottom surfaces. Assembly 114 pivots upwardly about axle 118 whereby if a jam should occur beneath assembly 114, assembly 114 is rotated counterclockwise (as shown) upwardly into engagement with the end of a spring-loaded leaf element 119 supported on the rearwardly extending tab 121. A bolt 122 and coil spring 123 serve to apply a spring load to leaf element 119, the lower end of bolt 122 being threadedly engaged into threads in tab 121.

Means for cyclically driving the articulated pads 116 of assembly 114 includes the chain drive belt 124 (FIG. 1) disposed about a sprocket 126 mounted on one of stub shafts 57. Drive belt 124 is trained about a driven sprocket 127 whereby as roller 14 rolls along the ground, sprocket 126 will roll at a related rate thereby driving the cyclic assembly 114 at a rate determined by the relationship of the gear ratio of sprockets 126, 127.

Finally, it has been observed that uneven wear on cutting blade 17, i.e., as where the wear on one end edge of the blade exceeds the wear on the blade at the other end, can be compensated for by adjusting the length of the support rods 66 by simply rotating the nuts carried on their upper ends so as to vary the support position relative to the ends of their respective lever arms 68, 69.

I claim:

1. In a mobile sod harvesting apparatus for moving in a path across a field of sod to be harvested and including a mobile carrier, upwardly inclined sod conveyor means disposed at its lower end to engage a ribbon of sod cut from the field to carry same upwardly from the field, means pivotally supporting the upper end of said conveyor means from said carrier to permit the lower end of said conveyor means to move in a single upstanding plane alongside and relative to said carrier to rise and fall in terrain following movement, an elongate cylindrical sod roller of substantial mass disposed to travel in advance of said conveyor means, means for supporting the lower end of said conveyor means from said roller, the last named means including sub-frame means supporting said roller to rock from side to side relative to said conveyor means about a pivot axis extending in the direction of travel of the roller, said pivot axis being spaced in a fixed predetermined distance from said mobile carrier and said pivot axis being disposed in a plane intermediate the ends of said roller and substantially normal to the axis of rotation thereof, whereby the axis of rotation of said roller is free to rise and fall and to tip from side to side in terrain following movement while said conveyor is free only to rise and fall, a sod cutting blade disposed to extend across said path, and means supporting said blade from said sub-frame to rock from side to side with said roller, and means for imparting reciprocating movement to said blade to cause it to advance and retreat into and out of cutting relation with the root portion of sod in said path to cut said ribbon of sod therefrom.

2. In a mobile sod harvesting apparatus for moving in a path across a field of sod to be harvested, a conveyor, a main frame supporting said conveyor, a sub-frame, an elongate roller of substantial mass riding on said sod, means serving to couple said roller in supporting relation to said main frame and sub-frame while permitting said roller and sub-frame to rock from side to side relative to said main frame about a pivot axis extending in the direction of travel of said main frame and spaced a fixed distance from said main frame, said pivot axis being disposed in a plane intermediate the ends of said roller and substantially normal to the axis of rotation thereof, an elongate cutter blade carried by said sub-frame for reciprocating movement into and out of the root portion of said sod for cutting a ribbon of sod from the earth, a reciprocating drive means carried by said rocking sub-frame and disposed beneath said ribbon of sod and coupled to drive said blade between advanced and retracted positions to cut the sod free of the earth.

3. In a sod harvesting apparatus for moving in a path across a field of sod to be harvested, a rigid inclined frame, pivot means at the upper end of said inclined frame to support same and permit the lower end thereof to rise and fall about a single axis while precluding pivoting about an axis transversely of the first named axis, an elongate sod roller of substantial mass interposed to support said lower end of the frame spaced from the sod field, a sub-frame carried by said roller and pivotally coupled to said frame to permit said roller to rock about an axis extending in the direction of said path and at a fixed distance from said frame, said pivot axis being disposed in a plane intermediate the ends of said roller and substantially normal to the axis of rotation thereof, an elongate cutter blade extending across said path behind and beneath said roller, and means supporting said cutter blade from said sub-frame to reciprocate into and out of the root portion of said sod to cut a ribbon of sod from said field while rocking with said sub-frame and rising and falling with said frame.

* * * * *